Nov. 11, 1930.   W. F. DEHUFF   1,781,321
MIXING MACHINE
Filed May 4, 1929                 3 Sheets-Sheet 1

Inventor
Walter F. Dehuff

By Mason Fenwick & Lawrence
Attorneys

Nov. 11, 1930.          W. F. DEHUFF          1,781,321
                       MIXING MACHINE
                      Filed May 4, 1929          3 Sheets-Sheet 2
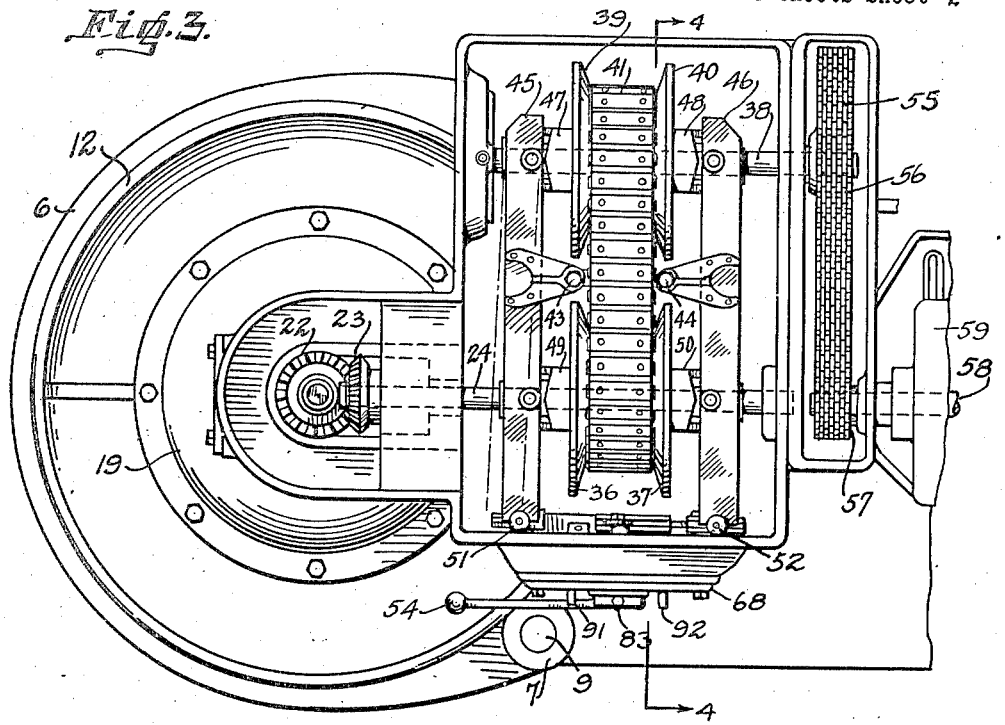
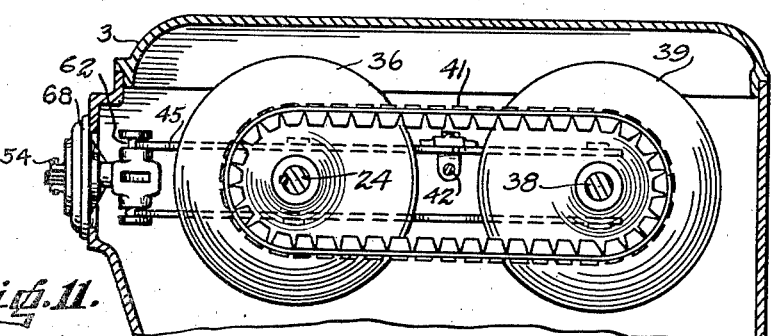
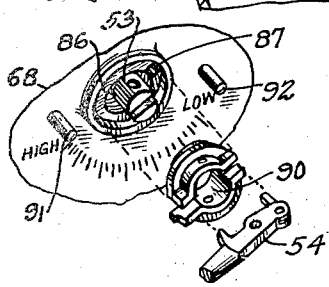
Inventor
Walter F. Dehuff
By Mason Fenwick & Lawrence
   Attorneys Nov. 11, 1930.  W. F. DEHUFF  1,781,321
MIXING MACHINE
Filed May 4, 1929
3 Sheets-Sheet 3
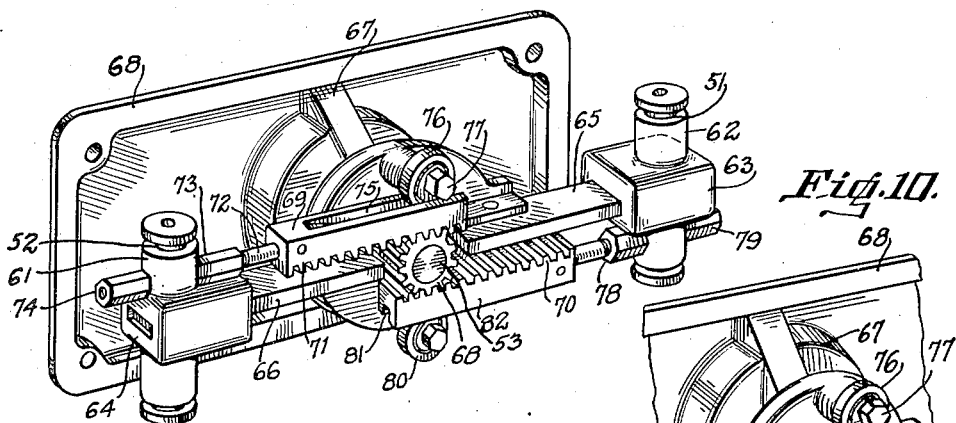

Patented Nov. 11, 1930

1,781,321

UNITED STATES PATENT OFFICE

WALTER F. DEHUFF, OF GLEN ROCK, PENNSYLVANIA

MIXING MACHINE

Application filed May 4, 1929. Serial No. 360,577. REISSUED

The invention forming the subject matter of this application is a variable speed power operated mixing machine, particularly adapted for mixing dough in large quantities, and for various other uses to which beaters of this type are adapted to be employed.

The main object of the invention is to provide a machine of this type in which the speeds of rotation of the beater may be regulated to a nicety in order to obtain the most efficient rate of rotation for the material being beaten or mixed.

Another object of the invention is to provide the speed varying mechanism of this type of machine with means for adjusting it to any desired given speed, and for locking the adjusting means in any desired position of speed control.

A further object of the invention is to provide devices of this type with a drive shaft bearing extending as closely as possible to the beater head, in order to give the most rigid support possible to the shaft directly connected to the beater.

Other objects of the invention will become apparent as the detailed description thereof proceeds.

In the drawings:

Fig. 3 is a plan view of the variable speed driving mechanism;

Fig. 4 is a section on the line 4—4 of Fig. 3;

Fig. 5 is a perspective view of mechanism for adjusting the variable speed drive of the machine;

Fig. 6 is a horizontal section of the mechanism illustrated in Fig. 5;

Fig. 7 is a section taken on the line 7—7 of Fig. 6;

Fig. 8 is a horizontal section taken on the line 8—8 of Fig. 6;

Fig. 9 is a perspective view of a rack member forming part of the adjusting mechanism shown in Figs. 5 and 7;

Fig. 10 is a fragmentary perspective view of a bearing forming part of the mechanism shown in Fig. 5; and Fig. 11 is an exploded perspective of part of the variable speed adjusting mechanism.

Figure 1:
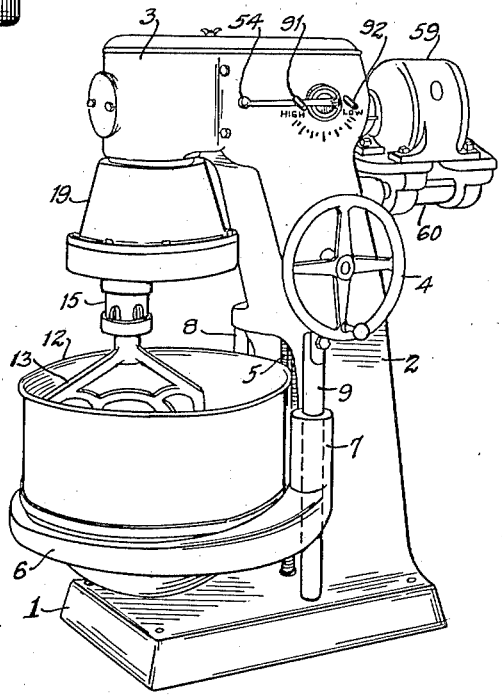
Fig. 1 is a perspective view of the entire machine.

Referring particularly to Fig. 1 of the drawings; the machine comprises a base 1 having a standard 2 extending vertically upward from one end thereof, and having a laterally extending head 3 extending from the upper end of the standard 2.

The standard 2 and head 3 are formed of a hollow casket; and bevel gearing (not shown) is mounted in this standard 2 for operation by a crank wheel 4 to rotate a screw 5, which is screwthreaded into the rear end of an annular bracket 6 provided with bosses 7, mounted to slide on guide rods 8 and 9 extending vertically upward from the base 1 and suitably secured, parallel to each other, to the standard 2.

Figure 2:
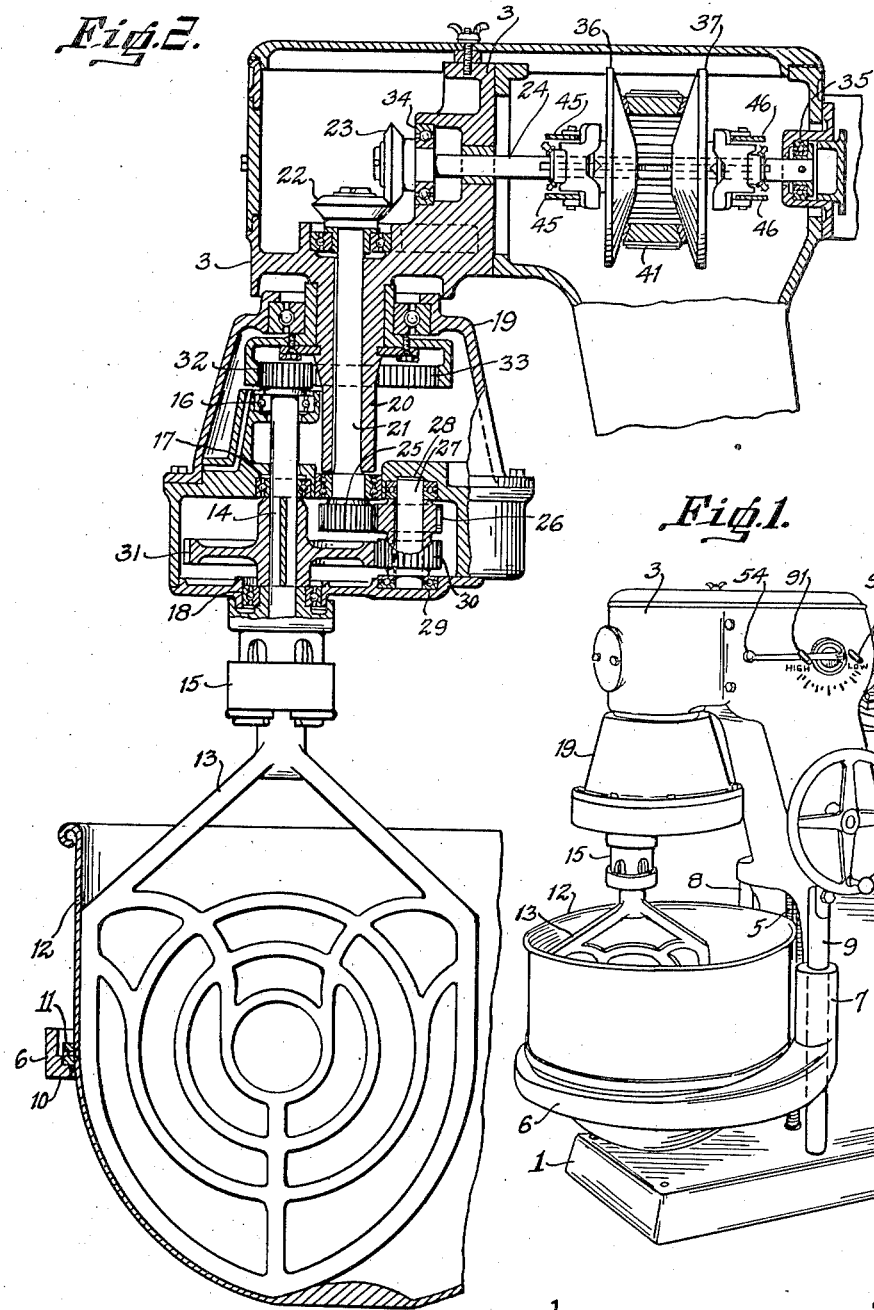
Fig. 2 is a fragmentary vertical section of the beater-drive mechanism, with part of the support and beater shown in elevation and to an enlarged scale.

The annular bracket 6 is provided with an internal flange 10 (see Fig. 2) adapted to engage a rib 11, suitably formed on or secured to the periphery of the mixing bowl 12, for the purpose of raising and lowering the bowl 12 relative to the beater 13 which is detachably secured to the beater spindle 14 by a coupling 15, the specific details of which are described and claimed in my copending application Serial No. 235,195, filed December 11, 1928.

The beater spindle 14 is mounted in ball bearings 16, 17 and 18, suitably secured in a casing 19, which is mounted for rotation on a bearing 20, in which is journaled the spindle drive shaft 21. Particular attention is directed to the fact that the bearing 20 is relatively very long and extends downwardly from the head 3 as far as possible toward the beater head. By this construction the rigid support of the beater spindle 14, and for the beater itself, is brought as closely as possible to the connection between the beater and the beater spindle, thereby lessening the leverage of the beater 13 about its supporting casing and preventing it from wobbling during its rotary and planetary movements in the mixing bowl 12.

The beater drive shaft 21 is provided at its upper end with a beveled gear 22 meshing with a second beveled gear 23, mounted on a variable speed driving shaft 24, the speed of rotation of which may be varied as desired by mechanism hereinafter described.

At its lower end the shaft 21 has a pinion 25 fixed thereto; and this pinion meshes with another pinion 26 keyed onto a stub shaft 27 which is journaled in ball bearings 28 and 29 in the casing 19. Integral with the pinion 26 and spaced apart therefrom, along the shaft 27, is a pinion 30 meshing with a large spur gear 31 keyed onto the beater spindle 14.

The upper end of the beater spindle 14 has a pinion 32 suitably fixed thereto; and pinion 32 meshes with a large internal spur gear 33 which is fixed to the bearing 20, in which the driving shaft 21 is journaled. By this construction, it will be obvious from inspection of the drawings when shaft 21 is rotated, its rotation will be imparted through the pinions 25, 26, 30, gear 31, to the beater spindle 14 to rotate the latter about its own axis.

When the spindle 14 rotates about its own axis, it also rotates the pinion 32, and this rotation causes the gear casing 19 to rotate bodily about the axis of the shaft 21, and impart a planetary rotation of the beater spindle 14 around the axis of the shaft 21. This planetary rotation, of course, is caused by the engagement of the pinion 32 with the internal gear teeth of the gear 33 which, as previously described, is fixed to the journal bearing 20 formed integral with the head 3 of the machine.

The driving shaft 24 for the beater spindle 21 is the driven shaft of the variable speed gearing, which is encased in the head 3 immediately above the standard 2. The shaft 24 is journaled in bearings 34 and 35 in the head 3, and has keyed thereon the conical disks 36 and 37 which are mounted to slide on the shaft 24 and to be rotated thereby.

A counter shaft 38 is journaled in the head 3 parallel to the shaft 24, and is also provided with disks 39 and 40 keyed on the shaft 38 to slide thereon and be rotated thereby. The disks 39 and 40 are similar in shape to the disks 36 and 37; and these disks have their apexes arranged toward each other in pairs. An endless belt 41, having the edges thereof sloping to correspond with the inclination of the sides of the disks, extends around each pair of disks and has its edges in contact with the inclined sides of the disks.

The belt 41 has its edges in frictional contact with the opposed inclined sides of each pair of disks and serves to impart the rotation, through said disks, of the shaft 38 to the shaft 24. The variation in speed between the shafts 38 and 24 is effected by adjusting the positions of the disks of each pair relative to each other. For example, the speed of the shaft 24 may be increased by spreading the disks 36 and 27 apart, and simultaneously moving the disks 39 and 40 toward each other.

In order to effect the simultaneous adjustments of the pairs of disks 36—37 and 39—40 a support 42 extends transversely of the head 3 between the stretches of the belt 41 (see Fig. 4), and pivots 43 and 44 are mounted on this support on opposite sides of belt 41. These pivots form fulcrums for adjusting levers 45 and 46, which are suitably pivoted to collars 47 and 48 slidable on the shaft 38 for moving the disks 39 and 40 toward and from each other as the levers 45 and 46 are swung about their fulcrums 43 and 44.

Similar collars 49 and 50 are pivotally connected to the levers 45 and 46 at the opposite side of the support 42 in order to move the disks 36 and 37 toward and from each other. To effect the simultaneous adjustment of the two pairs of disks in opposite directions, the levers 45 and 46 extend beyond the collars 49 and 50, and have their ends notched to seat pivotally in adjusting studs 51 and 52 formed on slide members adapted to move simultaneously in opposite directions relative to a crank shaft 53, which extends outwardly through the upper end of the head 3 to receive a locking and adjustable handle 54 (see Fig. 1).

The shaft 38 extends through the rear end of the head 3 and at the end thereof has secured thereto, a sprocket wheel 55 in mesh with a sprocket chain 56 which extends over a sprocket wheel 57 securely fixed to the rotor shaft 58 of a motor 59 which is mounted on a bracket 60 (see Fig. 1) extending from the rear upper end of the standard 2.

The studs 51 and 52 are formed on bosses 61 and 62, respectively, extending on opposite sides of sleeves 63 and 64, which are mounted to slide on rectangular slide members 65 and 66 extending in opposite directions from a bracket 67, cast on the inside of a plate 68 which carries all the mechanism for adjusting the levers 45 and 46 toward and from each other, and is adapted to be detachably secured to the side of the head 3.

The slides 65 and 66 extend in alinement with each other on opposite sides of the crank shaft 53. The shaft 53 has a pinion 68 secured to the end thereof, and this pinion meshes with racks 69 and 70, of which the rack 69 is fixed to the boss 61, and the rack 70 is fixed to the boss 62. The rack 69 is formed of a part 71 rectangular in cross-section and having a cylindrical shank 72 extending from one end thereof and screw-threaded to pass freely through an aperture formed in the boss 61. Adjusting and lock nuts 73 and 74 are threaded on the shank 72 to engage opposite sides of the boss 61, in order to lock the rack 69 in any desired position of adjustment in the boss 61. In order to hold the rack 69 in mesh with the pinion 68, the upper edge of the part 71 is slotted to provide a groove 75, adapted to receive a roller 76 which is rotatably mounted on a pivot 77, extending from the casting 67. Lock nuts 78 and 79 likewise secure the rack 70 to the boss 62, and a roller 80 slides in the groove 81, formed on the lower edge of the rectangular part 82 of the rack 70 to hold the rack in mesh with the side of pinion 68 opposite to the side engaging the part 71 of the rack 69.

The crank shaft 53 extends through the casting 67, and has its other end slotted to receive rotatably the adjusting and locking handle 54. The handle 54 is pivoted intermediate its ends on the pin 83 extending across the slot 84 in the end of shaft 53 in order to rock about the pin 83 and also engage the walls of the slot 84 to rotate the shaft 53 as desired.

A recess 85 is formed in the plate 68 concentric with the shaft 53, and in this recess a split locking ring 86 is mounted to rotate. The ends of this ring are spaced apart to form a space 87 adapted to receive slidably the free end of a locking wedge 88 which is pivotally mounted by a means of a pivot 89 on one end of the handle 54.

As will be evident from inspection of the drawings, particularly, from Fig. 7 thereof, when the wedge 88 is held out of engagement with the correspondingly shaped walls bounding the space 87, the handle 54 can be rotated freely on the plate 68 in order to rotate the shaft 53, and with it the pinion 68. Of course, as the handle 54 rotates, it will also rotate the locking ring 85 providing the wedge member 88 is not in locking contact with the walls of space 87. Whenever it becomes desirable to lock the shaft 53 in any desired position, it is only necessary to pull the free end of the handle 54 outwardly from the plate 68 to force the wedge 88 into contact with the opposed ends of the locking ring 86 to force the ring into braking and locking contact with the walls of the recess 85.

In order to hold the locking ring 86 in the recess 85, an annular casting 90 is seated in the recess 85 between the locking ring 86 and the shaft 53, and is also slotted to permit the arm 54 to rock about its pivot 83. The construction will be obvious from inspection of Figs. 6 and 7 of the drawings.

In order to limit the throw of the handle 54, the plate 68 is provided on its outer face with stops 91 and 92 (see Fig. 1) spaced apart so as to limit the rotation of the handle 54 to 180 degrees. An indicator may be formed on the plate 68 or on the side of the head 3 to cooperate with the handle 54 to indicate any desired setting of the handle 54 for any given speed of rotation of the beater 13.

It will be obvious from the disclosure that when the machine is set in motion, the speed of the beater 13 may be regulated as desired by rotating the handle 54 in one direction or the other between the stops 91 and 92, and that the machine may be held in any desired adjusted position to secure any predetermined rate of rotation of the beater 13 by merely pulling the handle end of the arm 54 outwardly from the plate 68 to cause the locking wedge 88 to engage the correspondingly shaped ends of the locking ring 86, and thereby lock the rack and pinion gearing carried by the plate 68 to hold the levers 45 and 46 in the desired position of adjustment.

What I claim is:

1. In a variable speed gear, the combination with a casing, two parallel shafts mounted therein, a spline on each shaft, a pair of cone-shaped driving elements held on each shaft by the spline and adapted to slide toward and away from each other, a belt operably passing between the driving elements of said pairs, levers pivoted between said parallel shafts and operably connected each to one driving element of each pair, means for simultaneously oscillating both of said levers to cause the driving elements of one pair to approach while the driving elements of the other pair recede from one another, said means comprising a stub shaft, an operating handle at one end for rotating said shaft, a gear at the other end, fixed slides extending radially of the axis of said shaft, at diametrically opposite points, guides slidable on said slides, and rack bars engaging said gear and connected to said slides.

2. In a variable speed gear, the combination with a casing, two parallel shafts mounted therein, a spline on each shaft, a pair of cone-shaped driving elements held on each shaft by the spline and adapted to slide toward and away from each other, a belt operably passing between the driving elements of said pairs, levers pivoted between said parallel shafts and operably connected each to one driving element of each pair, means for simultaneously oscillating both of said levers to cause the driving elements of one pair to approach while the driving elements of the other pair recede from one another, said means comprising a stub shaft, an operating handle at one end for rotating said shaft, a gear at the other end, fixed slides extending radially of the axis of said shaft, at diametrically opposite points, guides slidable on said slides, and rack bars engaging said gear and adjustably connected to said slides.

3. In a variable speed gearing, a combination of a casing, two parallel shafts mounted therein, a spline on each shaft, a pair of cooperating cone-shaped driving elements held on each shaft by the spline and adapted to slide toward and away from each other, a belt operably passing between the driving elements of said pairs, levers pivoted between said parallel shafts and operably connected each to one driving element of each pair, means for simultaneously oscillating said levers to cause the driving elements of one pair to approach while the driving elements of the other pair recede, said means comprising a stub shaft, an operating handle at one end for rotating said shaft, a gear at the other end, fixed slides extending radially of the axis of said shaft, at diametrically opposite points, guides slidable on said slides, and rack bars engaging said gear and connected to said slides, said rack bars being grooved in the sides remote from said gear, and guide rollers on said fixed axes engageable with said rack bars in said grooves.

In testimony whereof I affix my signature.

WALTER F. DEHUFF.